United States Patent [19]

Harris et al.

[11] Patent Number: 5,281,338
[45] Date of Patent: Jan. 25, 1994

[54] METHOD OF DECOLORIZING WATER

[75] Inventors: Ralph Harris; Anne M. Jacques; Melanie Brown; Alexander Buchan, all of Leatherhead, United Kingdom

[73] Assignee: Archaeus Technology Group Limited, Leatherhead, United Kingdom

[21] Appl. No.: 969,223

[22] PCT Filed: Aug. 12, 1991

[86] PCT No.: PCT/GB91/01369
§ 371 Date: Feb. 9, 1993
§ 102(e) Date: Feb. 9, 1993

[87] PCT Pub. No.: WO92/02460
PCT Pub. Date: Feb. 20, 1992

[30] Foreign Application Priority Data
Aug. 10, 1990 [GB] United Kingdom ............. 9017611.6

[51] Int. Cl.$^5$ ................................. C02F 1/28
[52] U.S. Cl. ................... 210/670; 210/688; 210/691; 210/917
[58] Field of Search ............... 210/917, 691, 670, 688

[56] References Cited

U.S. PATENT DOCUMENTS

| | | | |
|---|---|---|---|
| 3,032,496 | 5/1962 | Griffith | 210/917 |
| 3,533,940 | 10/1970 | Peniston et al. | 210/679 |
| 3,635,818 | 1/1972 | Muzzarelli | 210/198.2 |
| 4,125,708 | 11/1978 | Masri | 210/688 |
| 4,402,920 | 9/1983 | Lopez et al. | 423/8 |
| 4,775,650 | 10/1988 | Portier | 210/691 |
| 4,882,066 | 11/1989 | Portier | 210/691 |

FOREIGN PATENT DOCUMENTS

| | | |
|---|---|---|
| 380288 | 8/1990 | European Pat. Off. |
| 244125A1 | 3/1985 | Fed. Rep. of Germany |
| 58-153596 | 9/1983 | Japan |
| 338849 | 3/1971 | U.S.S.R. |
| 1045599 | 5/1964 | United Kingdom |

OTHER PUBLICATIONS

Muzzarelli, R. A. A., Chitin (Pergamon Press) pp. 62–63.

Primary Examiner—Stanley S. Silverman
Assistant Examiner—Cynthia L. Nessler
Attorney, Agent, or Firm—Reed & Robins

[57] ABSTRACT

A method of decolorising water colored by humic or fulvic acid, such as moorland runoff water, which method comprises bringing the water into contact with chitin or alginic acid as adsorbent. The adsorbent may be recycled after use by treatment with aqueous alkaline solution followed by treatment with an aqueous acid solution.

10 Claims, No Drawings

METHOD OF DECOLORIZING WATER

This invention relates to a method of decolourising water comprising humic or fulvic acid, for example moorland runoff water.

Water, such as that which runs off moorland, is coloured and as a result is aesthetically undesirable and unacceptable to customers. In addition humic substances may react with halogens, e.g. chlorine, during water treatment to produce trihalomethanes or other organohalogens (organhalons) which may represent a health hazard. Humic substances also reduce the effectiveness of chlorine disinfection. Colouration of water can be particularly pronounced following heavy rain after a drought. It is known that the colour may be removed from such water by chemical precipitation methods using for example aluminium sulphate and hydrated lime to adjust pH, followed by mixing, flocculation and physical separation of the flocs by for example air flotation. It is also known that activated carbon may be used to remove colour from water but this is expensive to regenerate and relatively inefficient and so activated carbon is generally only use for removal of odour/taste and pharmaceuticals such as unmetabolised drugs or their breakdown products. A further way to remove colour from water involves the use of ion-exchange resins. However, this is relatively expensive since the resins are expensive to regenerate.

It has now been found that colour may be effectively removed from such coloured water by adsorption of colouring components onto chitin or alginic acid. Chitin and alginic acid are low cost biomass materials which are readily available in large quantities.

The present invention therefore provides a method of decolourising water coloured by humic or fulvic acid, which method comprises bringing the water into contact with chitin or alginic acid as adsorbent. The invention also provides the use of chitin or alginic acid to decolourise such water. In this way the level of colour in the water can be reduced to an acceptable level.

An acceptable level of colour in the water may, for example, be a level of less than 20 Mazen units. Alternatively an acceptable level of colour may be such that the water may be mixed with uncoloured water to provide water with a colour level of less than 20 Hazen units. For example water with a colour level of less than 40 Hazen units may be mixed with equal volumes of uncoloured water to provide water with a colour level of less than 20 Haze units.

The colour of water is expressed in terms of Hazen units and one Hazen unit is defined as the colour produced by 1 mg/l of platinum in the form of chloroplatinic acid in the presence of 2 mg/l of cobaltous chloride hexahydrate. Samples are compared against standards either visually, or photoelectrically using a previously constructed calibration graph.

The water to be decolourised by the method of the present invention comprises humic and/or fulvic acid. These are polyphenolic acids found in the "humic fraction" of soils. The acids are formed as products of the anaerobic digestion of lignin and are resistant to further breakdown. They are formed as breakdown products of peat and produce colouration in for instance moorland runoff waters, e.g. acidic or neutral moorland runoff waters.

The coloured water may also contain additional contaminants such as other polyphenolic acids including those found in industrial waste and such as particulate material as turbidity and metal ions, e.g. aluminium, manganese or iron. Such additional contaminants may also be adsorbed by the adsorbent. Alternatively the coloured water may be substantially free of other contaminants such as metal ions.

The coloured water used in the method of the present invention is typically naturally neutral or acidic and has a pH from 5 to 7. The pH may however be specifically adjusted to optimise a particular step in water treatment such as flocculation, or aluminium or iron salt precipitation and may be outside this range.

The adsorbent used in the method of the present invention adsorbs coloured compounds, such as humic or fulvic acid, present in the water and so decolourises the water. The adsorbent may be chitin or alginic acid, and is preferably chitin. Chitin is a polysaccharide made up of molecules of N-acetylglucosamine linked together by 1,4-$\beta$ glycosidic bonds. It occurs in the exoskeleton of shellfish and insects, and may be readily obtained as a by-product of shellfish industries. Thus, a source of chitin is from the exoskeleton of shrimps or crabs. Crab-derived chitin is preferred. Chitin is also found in the cell walls of fungi such as basidiomycetes, ascomycetes and zygomycetes. Alginic acid is a linear polysaccharide polymer made up of $\beta$-(1,4)-D-mannosyluronic acid and - (1.4)-L-gulosyluronic acid residues which occurs in seaweed and is readily obtained therefrom.

The adsorbent may be pre-treated prior to use, for example to remove contaminants or to enhance colour removal performance. A suitable pretreatment involves heating the chitin in an alkali solution, eg sodium hydroxide. Suitably, a solution of 0.05 to 0.3 M sodium hydroxide may be used. The chitin may be heated in the alkali solution at a temperature of for example, about 70 C. Typically, 3 l of alkali solution for 500g of chitin may be used. After heating for a suitable period of time, eg about 2 hours, the chitin is rinsed with water. When chitin has been pretreated in this manner, it is desirable that the chitin is then washed (prewashed) further in acid in order to enhance its colour removal properties. Acid at a concentration of from 0.01 to 1 M may be used. Preferably, hydrochloric acid is used for this prewash. Typically, HCl at a concentration of 0.01 to 0.1 M eg. 0.01 to 0.05 M, is required. The prewash may be performed at room temperature.

The adsorbent may be used in any conventional form, such as for example as particles, beads, sheets or fibres. In particular particles may be used which are typically 0.5–10 mm in diameter, preferably from 0.5 to 2 mm in diameter.

The water may be contacted with the adsorbent by any conventional method. The treatment may for instance be performed as a mixed batch process in which adsorbent is mixed with a batch of coloured water and is then removed for example by filtration, sedimentation or centrifugation and decantation of a supernatant.

Preferably however the water is contacted with a bed, such as a packed bed, of adsorbent for instance in the form of a packed column of adsorbent. Other types of bed include a fluidised bed, a trickling filter bed or a slow filter bed. The type of arrangement which may be used can be selected by a person of skill in the art and will depend on factors such as the quantity of water to be treated and the condition of the water prior to treatment. The factors can be assessed by those of skill in the art familiar with water filtration systems in the light of the present invention. Water decolourisation may then be carried out in a continuous manner by passing coloured water through or over a bed. For example a packed bed comprises packed adsorbent through which the water to be treated is pumped or percolated under gravity to effect contact between the water and the adsorbent.

In a situation where the turbidity of the water to be decolourised is high, it is desirable to prefilter the water prior to contact with chitin. In the case of a continuous filtering process, this may be achieved by insertion of a prefilter in line ahead of a bed in order to trap particulate material and prevent blinding of the bed. Such a prefilter may consist of coarse chitin (e.g. of a particle size of 1 to 10 mm) or coarse sand (e.g. mesh 16/30), and will generally be shorter than the bed. It will be backflushed regularly with water to remove particulate material.

In a batch treatment the amount of adsorbent is preferably from 0.01 to 1.0, especially about 0.1, g of dry adsorbent per 10 ml of water. In a continuous treatment preferably 25 to 2500, more preferably 25 to 250, volumes of water per volume of adsorbent, are treated by contact with a packed bed, without recycling of adsorbent.

After the decolourising treatment, the water may be further treated to render it suitable for use as drinking water, for example by chlorination. The water may also be further treated if it is not intended for use as drinking water, to render it suitable for industrial or agricultural use. Such treatment may for example include aerobic or anaerobic microbial treatment, activated carbon treatment, sand filtration, flocculation, ultrafiltration or reverse osmosis. These treatments may also take place prior to treatment with chitin.

Following treatment of the water with adsorbent the adsorbent may be regenerated and recycled by treatment with an aqueous alkaline solution, comprising e.g. NaOH, to release the adsorbed coloured compounds and other adsorped materials (eg metal ions) from the adsorbent. The adsorbent may be treated as a batch following removal of adsorbent from a batch treatment or following removal of adsorbent from a packed bed following a continuous treatment. Alternatively, in the case of a continuous decolourising treatment the adsorbent may be recycled by passing aqueous alkaline solution through the bed of adsorbent.

After treatment with alkali the adsorbent may be reactivated by contacting with acidic water prior to reuse of the adsorbent in the treatment of coloured water. This treatment may take the form of a prewash of the type described above for the preparation of fresh adsorbent.

The concentration of the alkaline solution may for example be from 0.001 to 5.0M, such as from 0.01M to 0.5M and preferably 0.025 to 0.5M, in the case of NaOH or may be an equivalent concentration of another alkali, eg potassium hydroxide.

The amount of alkaline solution used to recycle the adsorbent in a batch recycling treatment is typically from 0.2 to 2 ml of 0.05M NaOH per g of adsorbent. The amount of alkali or acid required to regenerate and recycle adsorbent by passing through a packed bed is typically from 1 to 4 bed volumes, for example about 2 bed volumes followed by 2 bed volumes of acid. For example 2 bed volumes of 0.05M NaOH followed by 2 bed volumes of 0.05M HCl may be used. The recycling process is preferably selected so that colour is eluted in one bed volume or less. Regenerant solutions of acid and alkali may be discarded to waste but are preferably recharged to reach original strength and reused to minimise waste volumes.

The invention will now be illustrated by reference to the following Examples:

EXAMPLES

Growth and Preparation of Microorganisms For Colour Removal Experiments.

Bacteria were grown in Oxoid Nutrient Broth CM1 in 2 l flasks containing 1 l of medium. The cultures were inoculated to start growth with a 1% v/v inoculum of a 1 day old starter culture and incubated at 30° C. for 48 hours on a rotational shaker at 200 rpm to allow the cultures to reach stationary phase. The bacteria were harvested by centrifugation at 50,000 x g for 10 minutes followed by 3 washes in distilled water at 50,000 x g for 10 minutes before resuspension to a known volume.

Fungi were grown in Aspergillus Complete Medium in 2 l flasks containing 1 l medium. Growth was initiated by adding 1 ml of a spore suspension prepared by vigorously shaking a 10 mm diameter plug of a sporulated potato dextrose agar petri dish culture with 10 ml of water. Cultures were incubated for 5 days at 20° C. on a rotational shaker at 200 rpm to allow the cultures to reach stationary phase. Fungal mycelium was harvested by filtration through Whatman No. 91 filter paper followed by washing 3 times with distilled water.

Production of Lignin

Wheat straw was treated with dilute sulphuric acid (2% w/v) for 12 hours at 90° C. This hydrolysed the straw hemicellulose content. The remaining material was washed thoroughly with distilled water and dried at 100° C. to produce a crude lignin preparation. The yield of lignin from the straw was 60.0% on a dry weight basis.

Other materials were obtained from commercial sources. Brewers yeast had been freeze-dried for storage Known volumes of bacterial suspension were placed in a pre-weighed glass beaker and dried to constant weight at 100° C. oven. Known wet weights of fungal biomass were dried to constant weight. Biomass materials that were available in a dry form (chitin, chitosan, lignin, alginic acid, yeast) were weighed out directly for contact and other experiments.

Water samples were filtered through Whatman No. 91 filter paper to remove large particulate matter prior to use.

EXAMPLES 1 AND 2

30 ml of moorland runoff water coloured by humic and fulvic acids at an unaltered pH of 5.4 were mixed with a known weight (about 0.3 g) of pre-dried chitin (Example 1) or alginic acid (Example 2). The mixture was left standing at room temperature (about 22° C.) for 15 minutes then separated by filtration through Whatman No. 1 filter paper.

Colour was measured by absorbence at 400 nm against a distilled water blank. Glass cuvettes of path length 40 mm were routinely used. Measurements at individual wavelengths and wavelength scans were performed using a Pye-Unicam SP400 uv/visible Spectrophotometer. Readings given in the results correspond to apparent colour as the samples were not routinely passed through 0.45 μm filters which would give the true colour reading. The results are shown in Table 1 below.

COMPARATIVE EXAMPLE 1-11

Examples 1 and 2 were repeated using a variety of different materials as shown in Table 1. In the case of fungal mycelium a known weight (about 0.5 g) was used and in the case of bacterial suspensions a known volume (about 0.3 ml) was used. In the case of bacterial suspensions the bacteria were removed by centrifugation at 50,000 x g for 10 minutes followed by decanting of the supernatant rather than by filtration. The results are shown in Table 1 below.

TABLE 1

Percentage Reduction in Absorbency at 400 nm

| Example | Biomass | Percentage Reduction in Absorbency at 400 nm | | |
|---|---|---|---|---|
| | | Mean | s.d. | n |
| 1 | Chitin | 21 | 0.92 | 5 |
| Comp 1 | Chitosan | 2 | 0.05 | 5 |
| Comp 2 | Lignin | nr | | 1 |
| 2 | Alginic Acid | 25 | 0.53 | 5 |
| Comp 3 | Peat | nr | | 1 |
| Comp 4 | Bacillus | 14 | | 1 |
| Comp 5 | Pseudomonas | nr | | 1 |
| Comp 6 | Bacillus | 8 | | 1 |
| Comp 7 | Citrobacter | nr | | 1 |
| Comp 8 | Mucor sp. | nr | | 1 |
| Comp 9 | Penicillium sp. | nr | | 1 |
| Comp 10 | Aspergillus sp. | nr | | 1 |
| Comp 11 | Yeast | nr | | 1 | nr — no removal
n — number of determinations
sd — standard deviation

It can be seen that chitin and alginic acid are the most effective materials for removing colour under the conditions of this experiment. Some colour removal was seen with chitosan and bacterial biomass from two Bacillus species, however the quantity of removal was not suitable for continuing experimentation. Chitin and alginic acid were therefore studied in packed bed systems.

EXAMPLE 3

Alginic Acid Packed Bed

Pre-swollen alginic acid (approximately 14 g on a dry weight basis) was packed into a 30 cm × 1.5 cm diameter column (column volume 53 ml). Moorland runoff water coloured by humic and fulvic acids (adjusted to pH of 7.0 by addition of saturated $Ca(OH)_2$) was passed through the column at a rate of 60 ml per hour. Fractions of approximately 15 ml were collected at 15 minute intervals. Approximately 3.3 l was passed through the column and once steady state had been reached between 25 and 30 percent of material that absorbed at 400 nm was removed as measured by the method described in Examples 1 and 2.

Control experiments indicated that acidification of the water to pH 3.6 such as occurred on passage through this column of alginic acid reduced the absorbence of the coloured water by about 7 percent.

EXAMPLE 4

Chitin Packed Bed

Chitin (5 g dry weight) was packed into a 20 cm × 1.5 cm diameter column (column volume 35 ml). Moorland runoff water coloured by humic and fulvic acids was passed through the column at a rate of 13 ml per h and fractions collected at 60 min intervals. Approximately 910 ml was passed through the column with an average steady state removal of 74% of material that absorbed at 400 nm as measured by the method described in Examples 1 and 2.

The water eluted from this column was pooled and analysed, together with a sample of the water which was passed into the column.

TABLE 2

Analysis of Water Before and After Treatment with Chitin

| DETER- MINED | UNITS | RESULTS | | % REMOVAL |
|---|---|---|---|---|
| | | Untreated | Treated | |
| pH | | 6.0 | 6.0 | |
| Conductivity | uS/cm | 276 | 360 | |
| Turbidity | ftu | 3.4 | 1.8 | 47 |
| True Colour | Hazen | 70.8 | 10.2 | 86 |
| Aluminium | mg/l Al | 0.12 | <0.04 | >67 |
| Manganese | mg/l Mn | 0.05 | 0.03 | 40 |
| Iron | mg/l Fe | 0.62 | 0.11 | 82 |

The true colour reading in Hazen units due to dissolved matter was measured on a sample passed through a 0.45 μm filter using the photoelectric method of Knight, A.G. J. of Institution of Water Engineers, 1951, 5, 623. Turbidity (as formazin turbidity units) was determined by the standard HMSO method ("Colour and Turbidity of Waters. Methods for the Exdamination of Waters and Associated Materials 1981", HMSO Publications).

This analysis clearly shows the effectiveness of chitin at colour removal. Chitin also shows significant metal binding properties and turbidity removal

EXAMPLE 5

Elution of Coloured Material from Chitin

The elution of coloured material from packed beds of chitin was investigated. Samples of chitin (approx. 50 mg dry weight) taken from a packed bed containing 0.3 g of chitin through which 1910 ml of coloured water had been passed were placed in 4 ml of 0.05M NaOH. The NaOH solution was extremely effective at removing coloured material. A lower concentration of NaOH of 0.01M was also used. The extent of release was the same as that with 0.05 M NaOH although release took slightly longer.

COMPARATIVE EXAMPLE 12

Example 5 was repeated using 4 ml of 0.5M HCl in place of NaOH, but no release of colour was observed.

COMPARATIVE EXAMPLE 13

Example 5 was repeated using 4 ml of 1M NaCl in place of NaOH. Some release of colour, though less than with NaOH, was observed.

EXAMPLE 6

Elution of Coloured Material from a Packed Bed of Chitin

A packed bed of 0.3 g of chitin through which 1460 ml of coloured water had been passed was eluted using 0.05 M NaOH. The bed volume of the chitin was about 1.5 ml and the coloured material was eluted within a volume of 8 ml NaOH solution.

EXAMPLE 7

Comparison of Colour Removal Performance by Ground (0.5-1.0 mm) Shrimp and Crab Chitins in Packed Beds.

Single 30 cm columns were packed with either 5 g of ground shrimp chitin or 12 g of ground crab chitin giving bed lengths of 30 cm and total bed volumes of 0.053 l for both columns. Due to the higher packing density of crab chitin, more than twice as much of this material could be packed into a single bed than shrimp chitin.

The beds were washed with fresh tap water and 250 ml 0.01M HCl, then 2.625 l (49.5 bed volumes) of coloured water (initial true colour 31 Hazen units) was pumped through both columns simultaneously (flow rate 4.5 m/h).

Up to 99% removal of true colour was achieved by the crab chitin during treatment of the first 17 bed volumes of coloured water; the maximum removal of colour obtained using the shrimp chitin was 85% and this dropped below 80% after the passage of 7 bed volumes. After 30 bed volumes of coloured water had been treated, the crab chitin was still removing 83% true colour with the shrimp chitin removing 39%. The higher packing density of the crab chitin, allowing a much greater quantity of chitin to be used in a single bed, is likely to be responsible for the enhanced colour removal performance of crab chitin.

EXAMPLE 8

Effect of Particle Size and Strength of Acid Pretreatment on Colour Removal Performance of Crab Chitin Packed beds of 30 cm in length were washed with 300 ml tap water and 150-250 ml 0.01 or 0.05M HCl. The results of an investigation of the effects of particle size and strength of acid pretreatment are shown in Table 3. Approximately 2.85l (57 bed volumes) of coloured water (initial true colour 30 Hazen units) were pumped through a 0.5-1.0 mm particle size bed at 4.4 m/h pretreated with 0.01M HCl. Essentially complete (97-100%) removal of true colour was obtained for 30 bed volumes. Coloured water (initial true colour 36 Hazen units) was pumped through another 0.5-1 mm particle size bed pretreated with 0.05M HCl at 4.6m/h. Complete (100%) true colour removal was achieved for 39 bed volumes. Approximately 2.22 l (42 bed volumes) of moorland water (initial true colour 36 Hazen units) were pumped through a 0.25-0.5 mm particle size bed at 4.4 m/h pretreated with 0.01M HCl. Complete (100%) removal of true colour was achieved for 36 bed volumes.

Coloured material was eluted from the 0.25-0.5 mm bed using 4 bed volumes of 0.025M NaOH. The chitin was then reacidified using 4 bed volumes of 0.05M HCl. Coloured water (initial true colour 36 Hazen units) was again pumped through the column at 4.4 m/h for 3.12 l (59 bed volumes). Complete (100%) removal of true colour was achieved for 56 bed volumes.

Thus decreasing the particle size relative to the bed diameter increased the quantity of crab chitin which could be packed into a single column from 12 g to 14 g and also increased the colour removal performance In addition increasing the strength of the acid prewash from 0.01M to 0.05M significantly improved colour removal performance

TABLE 3

Effect of Pretreatments of Colour Removal Performance by Crab Chitin

| Particle Size (mm) | Weight of Chitin (g) | Bed Length (cm) | Strength HCl Pretreatment (M) | Number of Bed Volumes Treated at 100% Colour Removal |
|---|---|---|---|---|
| 0.5-1 | 12 | 30 | 0.01 | 30 |
| 0.5-1 | 12 | 30 | 0.05 | 39 |
| 0.25-0.5 | 14 | 30 | 0.01 | 36 |
| 0.25-0.5 | 14 | 30 | 0.05 | 56 |

EXAMPLE 9

Regeneration of Chitin in Packed Beds

Effect of Alkali Concentration on Elution of Colour From Preloaded, Dried Chitin in Miniature Packed Beds.

Twelve 5 ml packed beds were packed with shrimp chitin which had been previously loaded with colour and then dried. Colour was eluted from the columns using 0.05 M, 0.1M or 0.5M solutions of NaOH, KOH and $Na_2CO_3$ and distilled water as a control. Fractions of effluents were collected and the apparent colour monitored by absorbance at 400 nm in 1 cm path length cells.

In all cases the amount of colour eluted increased with increasing concentration of alkali (Table 4). NaOH and KOH eluted roughly equal amounts of colour at similar concentrations, both reagents were more effective at eluting colour than $Na_2CO_3$. Insignificant amounts of colour were eluted using water.

TABLE 4

Comparison of the Performance of three different Chemical agents at eluting colour from Shrimp Chitin

| Elution Agent | Concentration (M) | Absorbance at 400 nm of first 0.4 bed volume eluted |
|---|---|---|
| NaOH | 0.5 | 2.33 |
|  | 0.1 | 1.70 |
|  | 0.05 | 1.51 |
| KOH | 0.5 | 2.32 |
|  | 0.1 | 1.86 |
|  | 0.05 | 1.39 |
| $Na_2CO_3$ | 0.5 | 1.29 |
|  | 0.1 | 1.15 |
|  | 0.05 | 1.18 |
| Distilled Water | — | 0.15 |

EXAMPLE 10

Effect of NaOH and HCl Regenerant Concentrations on Colour Removal from Moorland Water by Crab Chitin Four 0.3 m columns packed with crab chitin were prewashed with water then acidified using 0.01M, 0.05M or 0.1M HCl. 1.4 l (27 bed volumes) of coloured water (initial true colour 57 Hazen units) was pumped through each column at 4.4 m/h. Colour was eluted from the beds using 2 bed volumes of 0.025M or 0.05M NaOH, followed by an acid rinse with 2 bed volumes of HCl (same concentration as for the prewash).

Fractions of column effluent collected during treatment of coloured water were analysed for true colour and during regeneration of the beds, were analysed for apparent colour. Colour removal after two regenerations i shown in Table 5.

TABLE 5
Effect of Regenerant Concentration on Colour Removal by Packed Beds

| Concentration NaOH (M) | Concentration HCl (M) | Number of Bed Volumes with 100% true Colour Removal | | |
|---|---|---|---|---|
| | | 1st Run | After 1st Regeneration | After 2nd Regeneration |
| 0.025 | 0.01 | 23 | 1 | 1 |
| 0.025 | 0.05 | 23 | 11 | 10 |
| 0.05 | 0.05 | 16 | 16 | 13 |
| 0.05 | 0.1 | 16 | 16 | 10 |

EXAMPLE 11

Re-use of Chitin and Regenerants

Multiple Loading/Regeneration Cycles of a Packed Bed

A 0.3 m column was packed with 14 g of hot 0.3M NaOH pretreated crab chitin, particle size 0.5 to 2.0 mm. The bed was prewashed with 2 l of tap water and 4 bed volumes of 0.05M HCl then loaded with 1.4 l (26 bed volumes) of coloured water (57 Hazen units). Complete (100%) removal of true colour was achieved for 12 bed volumes.

The column was then regenerated using 2 bed volumes of 0.05M NaOH followed by 2 bed volumes of 0.1M HCl. Fractions of the effluent were monitored for pH and apparent colour then pooled accordingly. Regenerants were made up to their original volume using 0.05M NaOH and 0.1 M HCl and kept for use in the next regeneration cycle. The loading/regeneration process was then repeated. In total one bed volume of highly coloured but neutral solution was discarded and replaced with an equivalent volume of fresh acid or alkali after each regeneration.

The column was loaded with colour a total of nine times and regenerated a total of eight times. After the fifth regeneration the pH of the pooled NaOH fractions had fallen from the original pH 12.13 to pH 10.47 and the pH of the pooled HCl fractions had increased from pH 1.41 to pH 1.60. Subsequently the alkali regenerant was made up to the original volume and pH using 0.05M NaOH plus a small quantity of 1M NaOH and the acid regenerant was made up to the original volume and pH using 0.1M HCl plus a small quantity of 1M HCl.

Following the first 4 regenerations, 11 bed volumes of water were treated at 100% colour removal before breakthrough occurred. Six bed volumes were treated at 100% colour removal following the last 4 regenerations. However even after the passage of 26 bed volumes, removals in excess of 90% were obtained after 8 regenerations. Although these colour removal performance results are not as high as in previous tests, they indicate that the chitin is maintaining its colour removal capacity for at least 8 regeneration cycles. The pH and colour elution profiles demonstrated that colour was eluted in approximately one bed volume and that the regenerants were effective at shifting pH reproducibly to release colour and then to recharge the chitin.

EXAMPLE 12

Performance of Crab Chitin Packed Bed

Four 1 m columns of particle size 0.5–2 mm, 0.3M NaOH pretreated crab chitin were linked in series and washed with water and four bed volumes of 0.01M HCl. 190 l (91 total bed volumes) of coloured water (30–32 hazen units) were passed through the bed and 100% removal of true colour was achieved by the first column alone.

The final three columns were regenerated using 4 bed volumes of 0.025M NaOH and 4 bed volumes of 0.01M HCl. A new column was packed and washed with water and HCl and installed as the first column of the series. A prefilter was placed in front of the four chitin columns to trap particles, which consisted of a 1 m column packed with reticulated foam pads. The prefilter column was backwashed daily. Approximately 365 l (183 total bed volumes) of coloured water (initial true colour 33 Hazen units) were treated at 100% true colour removal.

After 200 l of water were treated the flow rate in this experiment fell gradually from 5.4 m/h to 2.8 m/h. The prefilter column was particularly successful at trapping particulates, although flow rates still decreased between the daily backwash treatments.

TABLE 6

| Performance of a Packed Bed (4 × 1 m Beds Connected) of Crab Chitin at Colour Removal from Moorland Water | |
|---|---|
| Number of bed volumes treated at 100% colour removal | 183 |
| Linear approach velocity ($m^3/m^2/h$) | 2.8–5.4 |
| Bed Volume (liters) | 2 |
| HCl Pretreatment (M) | 0.01 |

We claim:

1. A method of decolourising water coloured by humic or fulvic acid without the use of a coagulant, which method comprises bringing the water into contact with chitin or alginic acid as adsorbent.

2. A method according to claim 1 wherein the chitin is shellfish chitin.

3. A method according to claim 1 wherein the chitin is crab chitin.

4. A method according to claim 1 in which the water is moorland runoff water.

5. A method according to claim 1 in which the water further contains metal ions or particulate material which are adsorbed or trapped by the adsorbent.

6. A method according to claim 1 which comprises continuously passing the water through a packed bed of absorbent.

7. A method according to claim 1 wherein the chitin is prewashed with an aqueous acid solution.

8. A method according to claim 7 wherein the solution is hydrochloric acid at a concentration of from 0.01 to 0.05M.

9. A method according to claim 1 which further comprises recycling the adsorbent by contact with an aqueous alkaline solution followed by contact with an aqueous acid solution.

10. A method according to claim 9 in which the aqueous alkaline solution is a NaOH solution at a concentration of from 0.01 to 0.1M.

* * * * *